United States Patent [19]
Toillie et al.

[11] Patent Number: 4,557,104
[45] Date of Patent: Dec. 10, 1985

[54] MOWER, AND METHOD OF MANUFACTURING ITS TRANSMISSION SHAFT

[75] Inventors: Alain Toillie, Strasbourg; Michel Wolff, Marmoutier, both of France

[73] Assignee: Kuhn S.A., Saverne, France

[21] Appl. No.: 457,658

[22] Filed: Jan. 13, 1983

[30] Foreign Application Priority Data

Feb. 8, 1982 [FR] France ............... 82 02131

[51] Int. Cl.⁴ ............................................ A01D 55/18
[52] U.S. Cl. ........................................ 56/13.6; 56/6
[58] Field of Search .............. 56/13.6, 192, 6, 157, 56/295; 74/665 GB, 665 H; 156/659.1

[56] References Cited

U.S. PATENT DOCUMENTS

| | | | |
|---|---|---|---|
| 2,933,675 | 4/1960 | Hoebyle | 156/659.1 |
| 3,143,004 | 8/1964 | Haskin | 74/665 |
| 3,507,102 | 4/1970 | Kline et al. | 56/13.6 |
| 3,708,966 | 1/1973 | Reber | 56/192 |
| 4,197,692 | 4/1980 | Weber | 56/13.6 |
| 4,227,365 | 10/1980 | van der Lely | 56/13.6 |

FOREIGN PATENT DOCUMENTS 0070585  1/1983  European Pat. Off. ............. 56/13.6

Primary Examiner—Gene Mancene
Assistant Examiner—John G. Weiss
Attorney, Agent, or Firm—Marmorek, Guttman & Rubenstein

[57] ABSTRACT

A transmission shaft, of a mower having one or more rotatable organs and gears, for transmitting rotation of the shaft to the gears. The shaft has a portion that is associated with the gears, and another portion that is not associated with the gears. The other portion has a transverse cross section within a shape that corresponds to that of the one portion end with a dimension smaller than that of the one portion. The reduced dimension of the other portion can be carried out by chemical action, such as by an acid attack.

9 Claims, 3 Drawing Figures

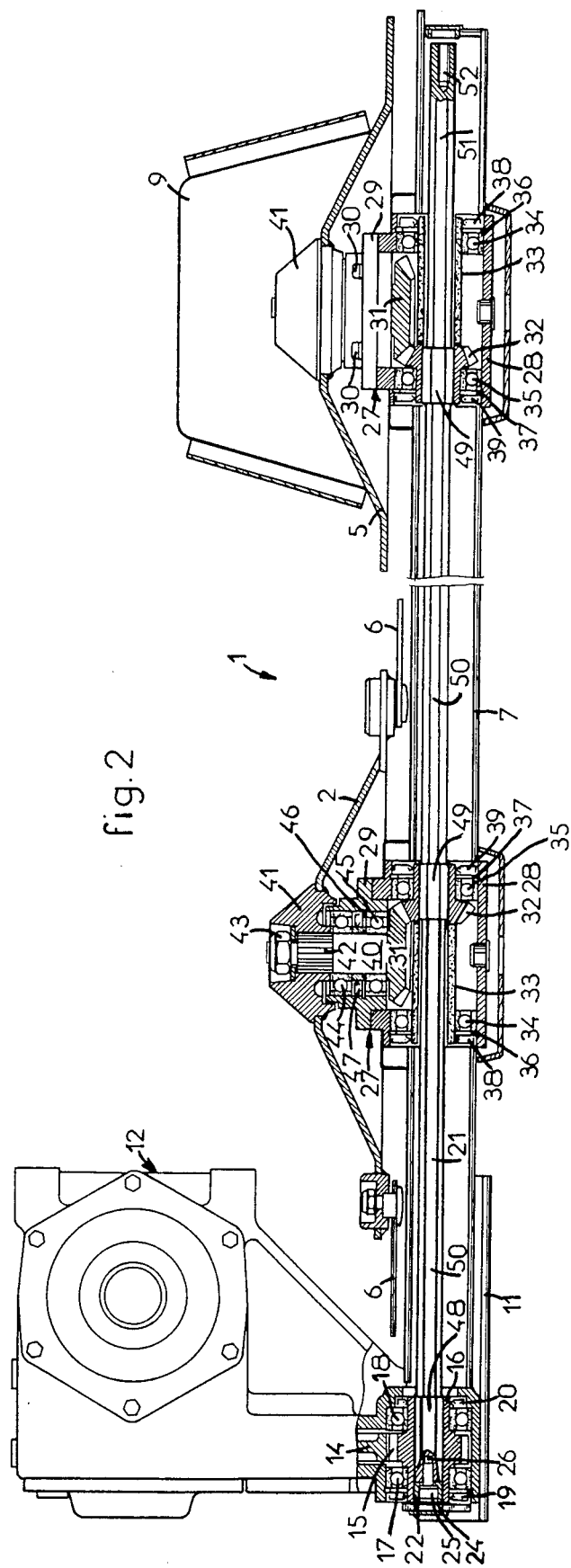

MOWER, AND METHOD OF MANUFACTURING ITS TRANSMISSION SHAFT

BACKGROUND OF THE INVENTION

The present invention relates to mowers with one or more rotatable organs, each provided with at least one cutting device and driven in rotation by a transmission shaft which cooperates with gears.

Mowers of the above-mentioned general type are known in the art. In known mowers, each rotatable organ or member is rotatably guided in a housing that is air-tight and/or water-tight, and wherein there are also located gears for driving the rotatable organs; and from which the transmission shaft can be pulled out without disturbing the air- or water-tightness of the housing. For transmitting the movement to the gears, the transmission shaft is generally provided with grooves which extend over its entire length, or this can be realized with the aid of a bar which has a constant, for example, hexagonal cross section. The shaft cooperates with one of the gears arranged in the housings which it crosses, and the bore of these gears has a profile which matches the profile of the transmission shaft.

In such a construction, it frequently happens that portions of the metallic, for example steel transmission shaft located between the gears that cooperate with the shaft oxidize in such a manner that the layer of oxide which forms on the shaft surface considerably increases the nominal dimension of the transverse cross section of these portions of the shaft to such an extent that dismounting of the shaft from the housings becomes difficult and in some cases even impossible.

It also frequently happens that during operation of the mower one or the other rotatable organ may be braked in its rotation by an obstacle in its path. If the braking is too great or if the rotatable organ is completely blocked in its rotation, the transmission shaft may be permanently deformed. In this case also, if this permanent deformation is too large, any dismounting of the shaft for repair work becomes a complicated operation.

This dismounting is even more difficult and even impossible when both of the above described events take place on the same shaft at or near the same time.

Mowers are also known in which the transmission shaft and the gears for driving the rotatable organs rotate in a lubricant. In this case the occurrence of oxidation is prevented. There exists the danger, however, that the transmission shaft may permanently be deformed and therefore will be difficult or impossible to remove.

For reducing these risks, it is known to provide transmission shafts with grooves only in the region where the shaft cooperates with the gears, whereas the portions located between these grooves are cylindrical and their diameter is smaller than the diameter of the grooves. Such a shaft, however, is not satisfactory because of its high cost due to difficulties of manufacture. For manufacturing this shaft, a complicated mechanical production process is necessary. The process starts with a workpiece formed as a bar of a round cross section and it must be worked to reduce the diameter of its cross section at portions where the shaft is out of reach with the gears. This operation requires turning and grinding to eliminate any streaks that may have been created during manufacture and which may be the start of a later rupture. The grooves then are cut in a final operation. This production process is even more complicated, as the shaft generally is relatively long.

This shaft has another considerable disadvantage. For mounting this shaft, a first gear must pass a first grooved portion. Then the threading of the shaft continues, so that the first grooved portion disconnects from the first gear which can now turn, in that between the first and the second grooved portions the cross section of the shaft is circular and has a much smaller diameter. In that case when the first grooved portion comes in contact with the second gear and the second grooved portion comes in contact with the first gear, the gears must be turned for a certain angle until all the grooves are aligned in order to make possible to continue threading of the shaft. This is a delicate operation for a single operator. It becomes even more difficult with the subsequent gears, as now there will be three gears to be turned, and so on. In fact, the operator does not even know whether one or more gears are not in place, or in what direction they should be turned, because they are located in a housing. It is to be understood that this mounting is difficult to carry out industrially. Moreover, this difficulty also takes place during dismouting of the shaft for repair.

SUMMARY OF THE INVENTION

Accordingly, it is an object of the present invention to provide a transmission shaft for a mower, and a method of manufacturing of the transmission shaft, which avoid the disadvantages of the prior art.

In keeping with these objects and with others which will become apparent hereinafter, one feature of the present invention resides, briefly stated, in a mower which has a transmission shaft with at least one portion which does not cooperate with any gear, the gear transmission means or gear means and has a transverse cross section with a shape substantially similar to the shape of a portion cooperating with a gear, the gear transmission means or gear means, and with a dimension which is smaller than the dimension of the portion cooperating with the gear.

When the transmission shaft is designed in accordance with the present invention, it can be produced at a relatively low cost, as its portions which do not cooperate with the gears can be manufactured chemically, for example, by acid attack.

Moreover, the previously recited problem that may in the past have arisen during mounting is eliminated, as between the portions cooperating with the gears, the gears can no longer turn or turn at most very little.

The novel features of the present invention will be set forth in particular in the appended claims. The invention itself, both as to its construction and method of manufacture, will be best understood from the following description which is accompanied by the following drawing.

BRIEF DESCRIPTION OF THE DRAWING

FIG. 2 is a sectional view of a left-hand portion of FIG. 1, taken along the plane II—II of FIG. 1; and FIG. 3 is a sectional view of a right-hand portion of FIG. 1, taken along the plane of II—II of FIG. 1.

DESCRIPTION OF A PREFERRED EMBODIMENT

Figure 1:
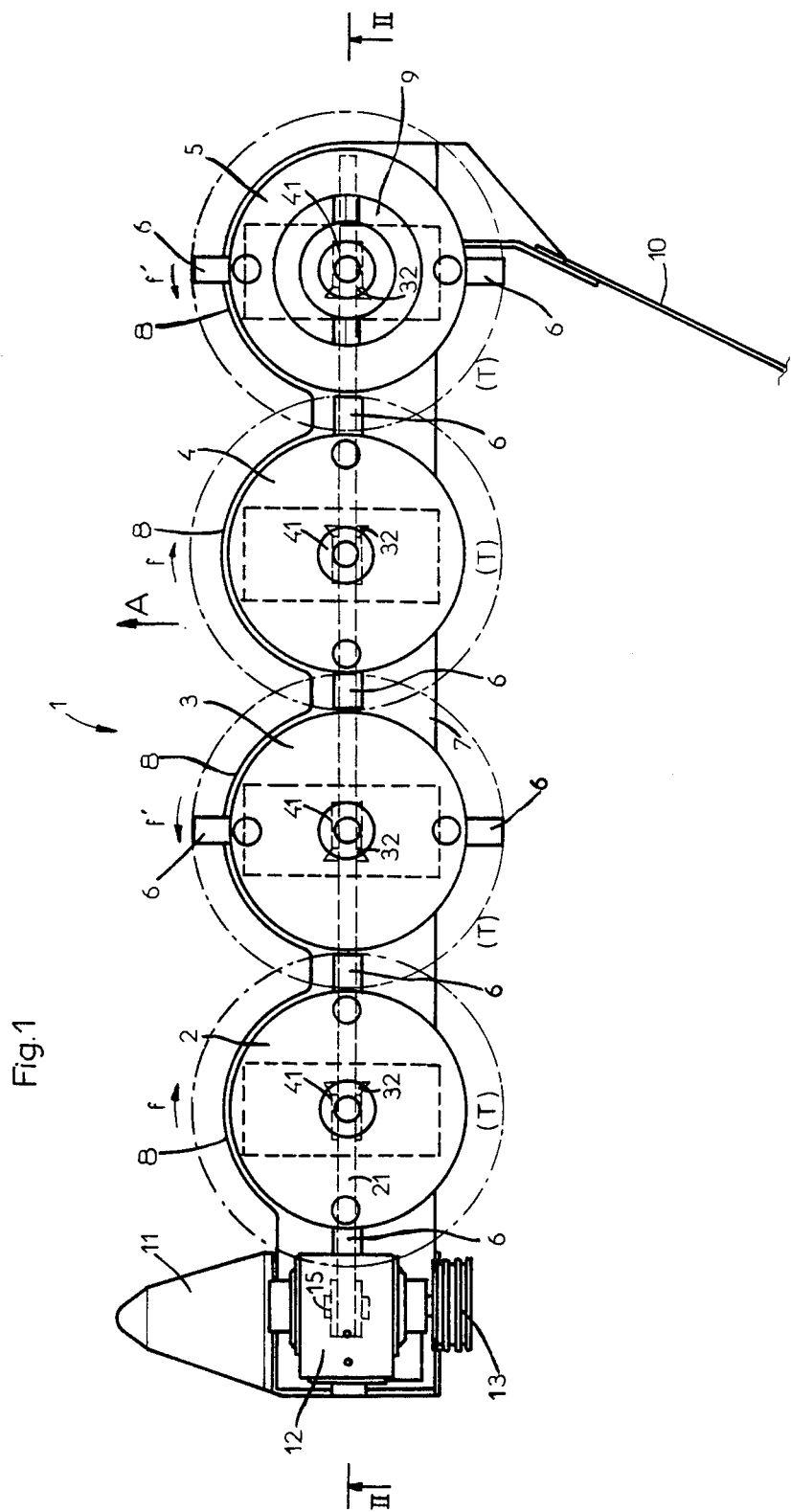
FIG. 1 is a plan view of a mower in accordance with the present invention.

A mower in accordance with the present invention has, as shown in FIG. 1, a cutterbar 1 with a plurality of discs 2, 3, 4 and 5 which are driven from below. Each of the discs is provided with cutting means such as, for example, with two cutters 6 located diametrically opposite one another and freely articulated about an axis of their holding devices. Thereby, the cutters 6 assume their working position under the action of centrifugal forces when the discs 2, 3, 4 and 5 rotate in directions of the arrows f and f'.

The cutters 6 describe paths T extending in front of the mower as seen in direction of advancement A, beyond a front rim of a housing 7 of the cutterbar 1. The front rim has circular sectors 8 with a radius which is greater than the radius of the path described by the discs 2, 3, 4 and 5, but at the same time smaller than the radius of the paths T described by the cutters 6. Thus, the sectors protect the discs 2, 3, 4 and 5 from any strike against obstacles which the cutterbar can encounter during operation.

The cutters 6 are not protected against the strikes. However, since the cutters are freely mounted on their discs 2, 3, 4 and 5, they can retract under the discs and again resume their working position as soon as the obstacle is passed.

An element 9 shaped, for example, as a conical trunk, is provided to separate the cut fodder from the fodder which s still standing. The element 9 is situated above the disc 5 located at the free end of the cutterbar 1. This free end is also provided with a swath board 10 which deflects the fodder cut by the discs 4, 5 toward the fodder cut by the discs 2, 3.

The other end of the cutterbar 1 has a shoe 11 and a transfer housing 12 located above the shoe, and which serves to rotate the transmission organs or members located in the housing 7 for driving in rotation the discs 2, 3, 4 and 5. The transfer housing 12 is actuated by a grooved pulley 13 which is driven by another grooved pulley and by belts (not shown in the drawing). The last-mentioned grooved pulley can be directly connected with a power source of a tractor by a shaft with universal joints. This end of the cutterbar is also linked with a chassis (not shown) to allow connection of the machine with the tractor.

It is to be understood that within the limits of the invention the drive of the transmission organs or members located in the housing 7 can also be carried out by other means, such as for example by a shaft passing directly through one of the discs 2, 3, 4 and 5.

The transfer housing 12 contains a certain number of gear transmission means, such as gears, of which only a gear 14 and a pinion 15 are shown in FIG. 2. The pinion 15 has a cylindrical part 16 which extends concentrically at both sides of its denture and which serves as a support for bearings 17 and 18 for rotatably guiding the pinion. The transfer housing 12 has at its base sealing joints 19 and 20 which extend between the walls of the housing 12 and the cylindrical part 16 to render the transfer housing 12 air- and water-tight, regardless of the presence of a transmission shaft 21.

The cylindrical part 16 has a bore 22 of a hexagonal transverse cross section, for cooperation with the transmission shaft 21. The transmission shaft 21 extends partially in the interior of the bore 22 and has in this region a hexagonal profile complementary to the profile of the bore 22. The transmission shaft 21 extends at least to the region of the disc 5 and serves for driving the discs 2, 3, 4 and 5 in a manner which will be described hereinbelow.

For maintaining the transmission shaft 21 axially, the pinion 15 and the cylindrical part 16 include a stop organ 24 which is rigidly connected to these two members or which is axially fastened to these two members. A screw 25 which its head leaning against the stop organ 24 and its stem passing through the latter, is screwed into a threaded hole 26 provided at the end of the transmission shaft 21.

The transmission shaft 21 passes under each disc 2, 3, 4 and 5 and traverses a housing 27 which is air- and water-tight regardless of the presence of the shaft. The housing 27 has a housing casing 28 and a housing cover 29 connected with one another by screws 30. A conical gear couple 31 and 32 is located in the housing and transmits the movement of the transmission shaft 21 to the respective discs 2, 3, 4 and 5. The pinion 32 which cooperates with the transmission shaft 21 is coaxial to and rigidly integral with a bushing 33 so that the connection between these two members is tight. The bushing 33 and the pinion 32 may also be made of one piece with one another, or the pinion 32 may be threaded onto the bushing 33 and connected to it for joint rotation, for example by grooves. The assembly including the pinion 32 and the bushing 33 is rotatably guided in the housing 27 by bearings 34 and 35 and is axially fastended to this housing by circlips 36 and 37. Sealing joints 38 and 39 extend between the housing 27 and the assembly of the pinion 32 and the bushing 33.

The pinion 31 is integral with a shaft 40 which is connected to a central part 41 of the respective discs 2, 3, 4 and 5 by grooves 42 and a nut 43. The shaft 40 is rotatably guided in the cover of the housing 27 by bearings 44 and 45 and is axially fastened to this cover by a circlip 46. A sealing joint 47 prevents escape of lubricant contained in the housing 27 through the bore of the cover 29 of the housing.

Similarly to the bore 22 for the assembly of the pinion 15 and the cylindrical part 16, a portion of the bore for the assembly of the pinion 32 and the bushing 33 has a transverse hexagonal cross section for cooperation with the transmission shaft 21.

As can be seen from FIG. 2, portions 48 and 49 of the transmission shaft 21, which cooperate respectively with the pinion 15 and the assemblies of the pinion 32 and the bushing 33 have a nominal dimension which is greater than the dimension of portions 50 located between the portions 48 and 49. The same is true with regard to a portion 51 extending beyond the disc 5.

The reduction of the nominal dimension of the portions 50 which do not cooperate with the pinion 15 or with the assemblies of the pinion 32 and the bushing 33, permits to withdraw the shaft 21 from the housing 27, even when the portions 50 are corroded or oxidized or when the shaft 21 is deformed. In accordance with the invention, the portions 50 and 51 have a cross section which is substantially similar to the cross section of the portions 48 and 49, that is hexagonal.

In this construction, the shaft 21 can be easily mounted since in the portions 50 which have the shape substantially similar to the shape of the portions 48 and 49, but have a smaller nominal dimension, the pinions 32 cannot turn. Thus, as soon as the portion 48 enters one of the pinions 32, the rotation of the shaft 21 relative to the one pinion will cease.

Moreover, the transmission shaft 21 can be made without mechanical working, both for carrying out the rotatable connection between the transmission shaft 21 and the pinion 15 or the assemblies of the pinion 32 and the bushing 33, such as for example a pin groove or channels, and for reducing the nominal dimension of the portions 50 and 51. The only mechanical working which takes place on the transmission shaft 21 are threaded holes 26 and 52. One of these holes serves to fasten the shaft axially, as described hereinabove. The other hole serves for dismounting the shaft by pulling a threaded stem screwed into the hole 52.

For manufacture of the transmission shaft 21 in accordance with the present invention, it suffices to start with a bar of hexagonal cross section with a nominal dimension equal to the dimension of the portions 48 and 49 cooperating with the pinion 15 and with the assemblies of the pinion 32 and the bushing 33. The region of the bar corresponding to the portions 48 and 49 are then coated, for example by a varnish. The thus prepared bar is plunged into an acid bath for the time needed to obtain the nominal dimension desired for the transverse cross section fo the portions 50 and 51.

The difference between the nominal dimension of the transverse cross section of the portions 48 and 49 and the portions 50 and 51 is at least equal to 0.2 mm and preferably is equal to 0.5 mm.

For the above-described chemical attack or action, the parameters, such as type of acid bath and its concentration, may be chosen so that the connection between the portions 48 and 49 and the portions 50 and 51 of the transmission shaft are approximately rounded. This is of advantage for this shaft which works essentially with twisting.

The portions 48 and 49 of the transmission shaft 21 may advantageously be covered with a material which hinders the contact-corrosion between the portions 48 and 49 and the pinions 15 and 32. In this case, the bore of the pinion 15 and the assemblies of the pinion 32 and the bushing 33 will have such a dimension that this bore can cooperate with the portions 48 and 49 covered by this material. This can advantageously be carried out by a protective varnish which protects also the portions 48 and 49 during the chemical production of the transmission shaft 21.

In the example shown in FIG. 2, the portions 49 have a length which is substantially identical to the length of the pinions 32 and cooperate directly with the latter. It is to be understood that within the scope of the present invention the portions 49 can cooperate only with the bushings 33, or the length of these portions can substantially be equal to the length of the assembly of the pinion 32 and the bushing 33.

It is also evident that the transmission shaft 21 can be made of several pieces connected with each other. In this case, each portion 49 can be divided into two halves belonging respectively to the ends of two following shafts. With such a construction, it is advantageous when the power transmission from one shaft end to the following shaft is carried out not by the pinion 32, but instead by the bushing 33. This makes possible to have the pinions of reduced dimensions. It is also understood that the cross section of the transmission shaft is not limited to a hexagonal shape. It may have the shape of a straight or curved polygon.

In the shown example the gears 31 and 32 which transmit the rotation of the shaft 21 to the respective discs 2, 3, 4 and 5 are conical gears. This transmission of rotation can also be carried out by a worm gearing, a helical gearing, a hypoid gearing, etc.

It is also evident that the portion 51 must not necessarily have a nominal dimension smaller than the nominal dimension of the portions 48 and 49 because in the example shown in FIG. 2, the portion 51 does not have to pass through the pinion 15 or the pinions 32 during mounting or dismounting of the transmission shaft 21. The reduction of the nominal dimension of the portion 51 is only dictated by the fact that it is not necessary to use varnish during manufacture of the shaft 21 if there is not any adnvatage. The portion 51 serves only to facilitate the screwing of the threaded stem into the hole 52 during the dismounting operation. It is also possible that the shaft 21 can be without such a portion 51. In this case the threaded stem serving for the dismounting of the shaft 21 must have an adequate length for permitting said dismounting of the shaft 21.

The invention is not limited by the details shown, since various modifications and structural changes are possible without departing in any way from the spirit of the present invention.

What is desired to be protected by Letters Patent is set forth in the appended claims.

We claim:

1. A mower, comprising in combination
a housing,
at least one rotatable member connected to said housing and provided with cutting means,
a rotatable transmission shaft normally disposed in said housing and longitudinally insertable into, and withdrawable from, said housing,
rotatable gear transmission means arranged to transmit rotation of said transmission shaft to said rotatable member,
said transmission shaft having an operative portion in driving connection with said gear transmission means,
said operative portion of said transmission shaft having a transverse cross section of a predetermined shape and a predetermined dimension,
another portion of said transmission shaft being free from any association with said gear transmission means during operation of the mower when the operative portion is in driving engagement with said gear transmission means, and having a transverse cross-section with a shape substantially corresponding to the shape of said operative portion and a dimension smaller than the dimension of said operative portion of said transmission shaft and, respectively, engaging said gear transmission means sufficiently during sliding insertion and, respectively, withdrawal, of said shaft through said gear transmission means, to restrain rotation of said gear transmission means during the sliding motion.

2. A mower as defined in claim 1, and further comprising at least a second rotatable member provided with cutting means, and at least second gear transmission means arranged to transmit rotation of said transmission shaft to said second rotatable member, said transmission shaft having a second operative portion associated with said second gear transmission means, and a second other portion free from being associated with said second gear transmission means, said second operative portion having a transverse cross section with a predetermined shape and a predetermined dimension, and said second other portion having a transverse cross section with a shape substantially corresponding to the shape of said operative portion, but with a dimension smaller than the dimension of said operative portion of said transmission shaft.

3. A mower as defined in claim 1, wherein the dimension of the transverse cross section of said other portion of said transmission shaft is smaller than the dimension of said transverse cross section of said operative portion by at least 0.2 mm.

4. A mower as defined in claim 3, wherein the dimension of the transverse cross section of said other portion of said transmission shaft is smaller than the dimension of the transverse cross section of the operative portion by 0.5 mm.

5. A mower as defined in claim 1, wherein said operative portion of said transmission shaft is coated with a material which prevents contact corrosion between said operative portion of said transmission shaft and said gear transmission means.

6. In a method of manufacturing a rotatable mower transmission shaft, said mower having at least one rotatable member provided with cutting means, and gear transmission means for transmitting rotation of the transmission shaft to the rotatable member, the steps comprising, forming an operative portion of the transmission shaft, which is in driving connection with the gear transmission means and has a transverse cross section with a predetermined shape and dimension, and forming another portion of the transmission shaft, free from being associated with the gear transmission means and has a transverse cross section with a shape substantially corresponding to the shape of the operative portion and a dimension smaller than the dimension of the operative portion of the transmission shaft.

7. A method as defined in claim 6, wherein said other portion forming step includes chemically acting upon the other portion so as to reduce the dimension of its transverse cross section relative to the dimension of the transverse cross section of the operative portion of the transmission shaft.

8. A method as defined in claim 7, wherein said chemically acting step includes carrying out an acid attack on said other portion of the transmission shaft.

9. A method as defined in claim 7, and further comprising the step of covering the operative portion of the transmission shaft with a material which protects the operative portion during the chemically acting step, and which prevents also thereafter contact corrosion between the operative portion and the gear transmission means.

* * * * *